United States Patent
Zhang et al.

(10) Patent No.: US 9,882,795 B1
(45) Date of Patent: Jan. 30, 2018

(54) SIGNAL LOSS DETECTOR

(71) Applicant: Xilinx, Inc., San Jose, CA (US)

(72) Inventors: Hongtao Zhang, San Jose, CA (US); Geoffrey Zhang, San Jose, CA (US); Yu Xu, Palo Alto, CA (US); Patrick Satarzadeh, San Jose, CA (US); Zhaoyin D. Wu, San Jose, CA (US)

(73) Assignee: XILINX, INC., San Jose, CA (US)

( * ) Notice: Subject to any disclaimer, the term of this patent is extended or adjusted under 35 U.S.C. 154(b) by 15 days.

(21) Appl. No.: 14/689,327

(22) Filed: Apr. 17, 2015

(51) Int. Cl.
*H04L 12/26* (2006.01)
*H04L 25/03* (2006.01)
*H04L 7/00* (2006.01)

(52) U.S. Cl.
CPC ........ *H04L 43/0811* (2013.01); *H04L 7/0087* (2013.01); *H04L 25/03057* (2013.01)

(58) Field of Classification Search
CPC ......... H04L 25/03267; H04L 25/03006; H04L 7/0058; H04L 27/01
See application file for complete search history.

(56) References Cited

U.S. PATENT DOCUMENTS

| | | | |
|---|---|---|---|
| 7,782,935 B1 * | 8/2010 | Wong .................... | H03H 11/26 375/229 |
| 8,477,833 B2 * | 7/2013 | Bulzacchelli ..... | H04L 25/03057 375/233 |
| 2010/0309791 A1 * | 12/2010 | Fuller ....................... | H04L 1/20 370/242 |
| 2011/0249774 A1 * | 10/2011 | Thakkar ............ | H04L 25/03057 375/316 |
| 2012/0170621 A1 * | 7/2012 | Tracy ................ | H04L 25/03038 375/219 |
| 2013/0243071 A1 * | 9/2013 | Chmelar ............... | H04L 25/063 375/233 |
| 2014/0177693 A1 * | 6/2014 | Zhong ..................... | H04L 27/01 375/226 |
| 2014/0177697 A1 * | 6/2014 | Nguyen ........... | H04L 25/03057 375/233 |
| 2014/0233619 A1 * | 8/2014 | Sindalovsky ........... | H04L 27/01 375/224 |
| 2015/0110165 A1 * | 4/2015 | Ramadoss ......... | H04L 25/03885 375/233 |
| 2015/0349991 A1 * | 12/2015 | Iyer ................... | H04L 25/03146 375/233 |

* cited by examiner

*Primary Examiner* — Daniel Washburn
*Assistant Examiner* — Eboni Hughes
(74) *Attorney, Agent, or Firm* — Robert M. Brush (57) ABSTRACT

In an example, an apparatus for detecting signal loss on a serial communication channel coupled to a receiver includes an input, a detector, and an output circuit. The input is configured to receive decisions generated by sampling the serial communication channel using multiplexed decision paths in a decision feedback equalizer (DFE). The detector is coupled to the input and configured to monitor the decisions for at least one pattern generated by the multiplexed decision paths in response to absence of a serial data signal on the serial communication channel. The output circuit is coupled to the detector and configured to assert loss-of-signal in response detection of the at least one pattern by the detector.

20 Claims, 5 Drawing Sheets

SIGNAL LOSS DETECTOR

TECHNICAL FIELD

Examples of the present disclosure generally relate to electronic circuits and, in particular, to a signal loss detector for a receiver in a serial communication system.

BACKGROUND

High-speed data communication systems frequently rely on clock and data recovery (CDR) circuits within the receiver rather than transmitting a reference clock with the data. For example, serial data communication may include the use of a serializer-deserializer (SERDES) at each end of a communication link. Within a SERDES, a CDR may extract a clock that is embedded in the incoming data stream. Once a clock is recovered, the clock is used to sample the incoming data stream to recover individual bits.

During propagation, data signals may experience distortion through the bandwidth-limited transmission channel. The distortion can result in spreading of signal pulse energy from one symbol period to another. The resulting distortion is known as inter-symbol interference (ISI). In general, ISI becomes worse as the speed of the communication system increases. As a result, high-speed communication systems often incorporate circuitry to equalize the effects of ISI. One technique involves use of a decision feedback equalizer (DFE) in the receiver. A DFE in the receiver can mitigate post-cursor ISI (i.e., the spreading of a previous symbol into a current symbol). Another technique involves use of a feed forward equalizer (FFE) in the transmitter to equalize the signal prior to transmission through the channel. An FFE can mitigate pre-cursor ISI (i.e., the spreading of a future symbol into a current symbol).

Loss-of-signal detection is required for some communication systems. One technique for detecting loss-of-signal is use of an analog envelope detector in the receiver to detect signal magnitude, which depends on data rate and channel loss. If the detection threshold of the envelope detector is too high, there is a risk of false loss-of-signal detection. Thus, design of a low-threshold envelope detector that operates reliably at high speeds is challenging.

SUMMARY

Techniques for providing a signal loss detector and a method of detecting loss of signal for a receiver in a serial communication system are described. In an example, an apparatus for detecting signal loss on a serial communication channel coupled to a receiver comprises an input, a detector, and an output circuit. The input is configured to receive decisions generated by sampling the serial communication channel using multiplexed decision paths in a decision feedback equalizer (DFE). The detector is coupled to the input and configured to monitor the decisions for at least one pattern generated by the multiplexed decision paths in response to absence of a serial data signal on the serial communication channel. The output circuit is coupled to the detector and configured to assert loss-of-signal in response detection of the at least one pattern by the detector.

In another example, a method of detecting loss of signal on a serial communication channel coupled to a receiver comprises: receiving decisions generated by sampling the serial communication channel using multiplexed decision paths in a decision feedback equalizer (DFE); monitoring the decisions for at least one pattern generated by the multiplexed decision paths in response to absence of a serial data signal on the serial communication channel; and asserting loss-of-signal in response to detection of the at least one pattern.

In another example, a receiver comprises a DFE and a signal loss detector. The DFE is configured to generate decisions by sampling a serial communication channel using multiplexed decision paths. The signal loss detector is, coupled to the DFE and configured to monitor the decisions for at least one pattern generated by the multiplexed decision paths in response to absence of a serial data signal on the serial communication channel and assert loss-of-signal in response to detection of the at least one pattern.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
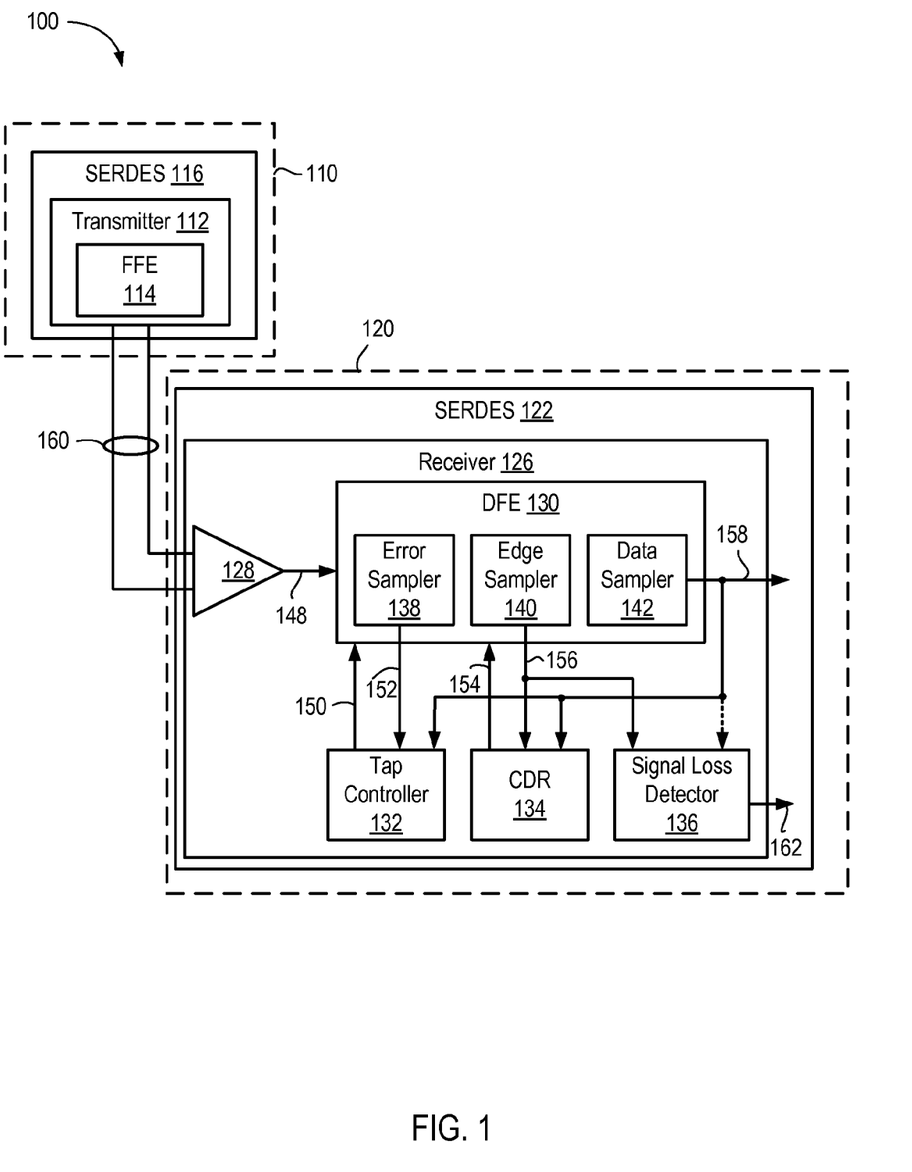
FIG. 1 is a block diagram depicting an example of a serial communication system.

FIG. 1 is a block diagram depicting an example of a serial communication system 100. The serial communication system 100 comprises a transmitter 112 coupled to a receiver 126 over a conductor referred to herein as a serial communication channel 160 (or communication channel 160 or channel 160). The transmitter 112 can be part of a serializer-deserializer (SERDES) 116. The receiver 126 can be part of a SERDES 122. The channel 160 comprises an electrical path between the transmitter 112 and the receiver 126 and can include printed circuit board (PCB) traces, vias, cables, connectors, decoupling capacitors, and the like. The SERDES 116 can also include a receiver (not shown). The SERDES 122 can also include a transmitter (not shown). In some examples, the SERDES 116 can be disposed in an integrated circuit (IC) 110, and the SERDES 122 can be disposed in an IC 120.

In general, the transmitter 112 generates a serial data signal from a parallel data path (serialization). The serial data signal has a particular data rate (symbol rate). In some examples, data bytes from the parallel data path can be encoded prior to serialization using, for example, and 8B/10B encoder or the like. The transmitter 112 can include a feed forward equalizer (FFE) 114 to equalize the serial data signal prior to transmission over the channel 160. The FFE 114 can be used to mitigate pre-cursor inter-symbol interference (ISI) caused by the channel 160. The transmitter 112 drives the baseband serial data signal onto the channel 160 using a modulation technique, such as binary non-return-to-zero (NRZ) pulse amplitude modulation (PAM). The channel 160 propagates electrical signal(s) representing symbols of the serial data signal (e.g., logic "1" and logic "0") towards the receiver 126.

In the example shown, the channel 160 is a differential channel. Data on the differential channel is represented using two electrical signals ("true" and "complement" signals). A logic "0" is represented by driving the true signal to its lower voltage limit and driving the complement signal to its upper voltage limit. A logic "1" is represented by driving the true signal to its upper voltage limit and driving the complement signal to its lower voltage limit. Thus, the logic value of each transmitted symbol is based on the difference between the true and complement signals, and not based on the level of either signal individually. In other examples, the channel 160 can be a single-ended channel.

The receiver 126 receives an analog signal from the channel 160. The analog signal may include the serial data signal transmitted by the transmitter 112 as distorted by the channel 160. In case of serial data signal loss at the receiver 126, the analog signal comprises only the effects of noise (including any DC offset) on the channel 160. In the example shown, the receiver 126 includes a buffer 128, a decision feedback equalizer (DFE) 130, a tap controller 132, a clock and data recovery circuit (CDR) 134, and signal loss detector 136. The buffer 128 is coupled to the channel 160 for receiving an analog signal 148. The buffer 128 couples the analog signal 148 to the DFE 130. In the example shown, the analog signal 148 output by the buffer 128 comprises a single-ended analog signal. In other examples, the analog signal 148 can be a differential analog signal and the DFE 130 can be configured to process the differential analog signal. The buffer 128 may perform automatic gain control (AGC) to establish a working voltage level for the analog signal 148. For example, the buffer 128 can include a variable gain amplifier (VGA) configured to set the average amplitude of the analog signal 148 to a configurable value.

The DFE 130 receives the analog signal 148 from the buffer 128. In general, the DFE 130 applies the analog signal 148 to sampler circuits that make decisions as to whether the amplitude of the analog signal 148 represents a logic "0" or a logic "1" (decisions). The decisions are affected by feedback based on prior decision(s). Prior decision(s) can be used to adjust the amplitude of the analog signal 148 and/or the decision thresholds of the sampler circuits sampling the analog signal 148. The number of prior decision(s) used as feedback equate to the number of taps in the DFE 130. In various examples herein, the DFE 130 includes a single tap. However, it is to be understood that the techniques described herein can be used with a DFE having a plurality of taps.

The DFE 130 includes a data sampler 142, an edge sampler 140, and an error sampler 138. The data sampler 142 outputs a serial data signal 158, the edge sampler 140 generates an edge signal 156, and the error sampler 138 generates an error signal 152. The serial data signal 158, the edge signal 156, and the error signal 152 comprise "clean" digital signals alternating between two voltage levels corresponding to a logic "1" and a logic "0" and timed by a sampling clock. The data sampler 142, the edge sampler 140, and the error sampler 138 each functionally operate as a 1-bit analog-to-digital converter (ADC) and may also be referred to as "slicers" or "decision elements".

The data sampler 142 samples the analog signal 148 at the mid-point between edges of the data eye, compares the samples with decision thresholds, and generates symbol decisions. The edge sampler 140 samples the analog signal 148 at the edges of the data eye, compares the samples with decision thresholds, and generates edge decisions. The data sampler 142 and the edge sampler 140 receive sampling clocks from the CDR 134. In various examples herein, the data sampler 142 and the edge sampler 140 each include parallel decision paths (decision paths). That is, each of the data sampler 142 and the edge sampler 140 sample the analog signal 148 on two parallel paths. The data sampler 142 and the edge sampler 140 multiplex the parallel decision paths to provide the serial data signal 158 and the edge signal 156, respectively (multiplexed decision paths).

Different DFE architectures having multiplexed decision paths can be employed. In an example, the DFE 130 comprises a half-rate architecture. In a half-rate architecture, the DFE 130 makes decisions on parallel decision paths referred to as even and odd paths. The even and odd paths are sampled using sampling clocks having two different phases and half the rate of the data rate of the expected serial data signal. The even and odd paths are then multiplexed to produce decisions at full data rate. In another example, the DFE 130 comprises speculative or "look-ahead" architecture. In a speculative architecture, the first tap is "unrolled" and removed from the feedback path. The basic concept behind a speculative DFE is that every symbol is a logic "0" or a logic "1" and the decision threshold for both possibilities is known. Thus, the DFE 130 makes two separate decisions for each symbol on parallel decision paths using two separate decision thresholds. The decision thresholds are determined based on the previous decision. The parallel decision paths are multiplexed to select the "correct" decision based on the previously selected decision. Other DFE architectures having multiplexed decision paths are possible (e.g., a combined half-rate and speculative DFE). In general, the data sampler 142 and the edge sampler 140 have architectures with multiplexed decision paths. As described herein, when the serial data signal is not present on the channel 160, the output decisions obtained from the multiplexed decision paths will have deterministic patterns. The signal loss detector 136 can detect the deterministic patterns to identify signal loss.

The CDR 134 processes the serial data signal 158 and the edge signal 156. The CDR 134 monitors amplitude transitions of the analog signal 148 and selects an optimal sampling phase for the data sampler 142 at the mid-point between edges (e.g., center of the data eye). For example, the CDR 134 can include a bang-bang phase detector that receives the serial data signal 158 and the edge signal 156 as input and outputs increment and decrement signals for adjusting phase of clock signal(s). The CDR 134 can include a phase-locked loop (PLL) or the like for generating one or more clock signals. The CDR 134 can also include various phase-shift circuits for converting the clock signal(s) into sampling clocks 154 of different phases, which are coupled to the DFE 130.

The tap controller 132 is configured to receive the error signal 152 from the error sampler 138 and the serial data signal 158 from the data sampler 142. The error sampler 138 samples the analog signal 148 at the mid-point between data edges using an expected decision threshold. The error signal 152 indicates whether the amplitude of the analog signal 148 is above or below the expected decision threshold. The tap controller 132 receives the error signal 152 and the serial data signal 158 and executes an algorithm to compute tap weights for the DFE 130. In an example, the tap controller 132 performs a least-mean-squire (LMS) algorithm to adjust the tap(s) of the DFE 130. For example, the tap controller 132 can implement a sign-error LMS algorithm, a sign-data LMS algorithm, or a sign-sign algorithm based on the error signal 152 and the serial data signal 158. These and other types of LMS algorithms are well known in the art.

In an example, the signal loss detector 136 is configured to receive the edge signal 156 from the DFE 130. The signal loss detector 136 monitors the edge signal 156 for one or more possible deterministic patterns indicative of signal loss at the receiver 126. The deterministic patterns are a result of sampling noise in the absence of signal on the channel 160 using multiplexed decision paths. The signal loss detector 136 generates a signal 162 that indicates whether signal loss has been detected. In another example, the signal loss detector 136 can monitor the serial data signal 158 output from the data sampler 142 for deterministic patterns indicative of signal loss at the receiver 126. In another example, the signal loss detector 136 can monitor both the edge signal 156 and the serial data signal 158. Examples of deterministic patterns indicative of signal loss at the receiver 126 are described below with respect to example architectures of the DFE 130. An example of the signal loss detector 136 is also described below.

The structure of the receiver 126 shown in FIG. 1 is just one example that can be used with the signal loss detector 136. In another example, the error sampler 138 can be a separate circuit from the DFE 130 or part of another circuit. The edge sampler 140 can be a separate circuit from the DFE 130 or part of another circuit.

Figure 2:
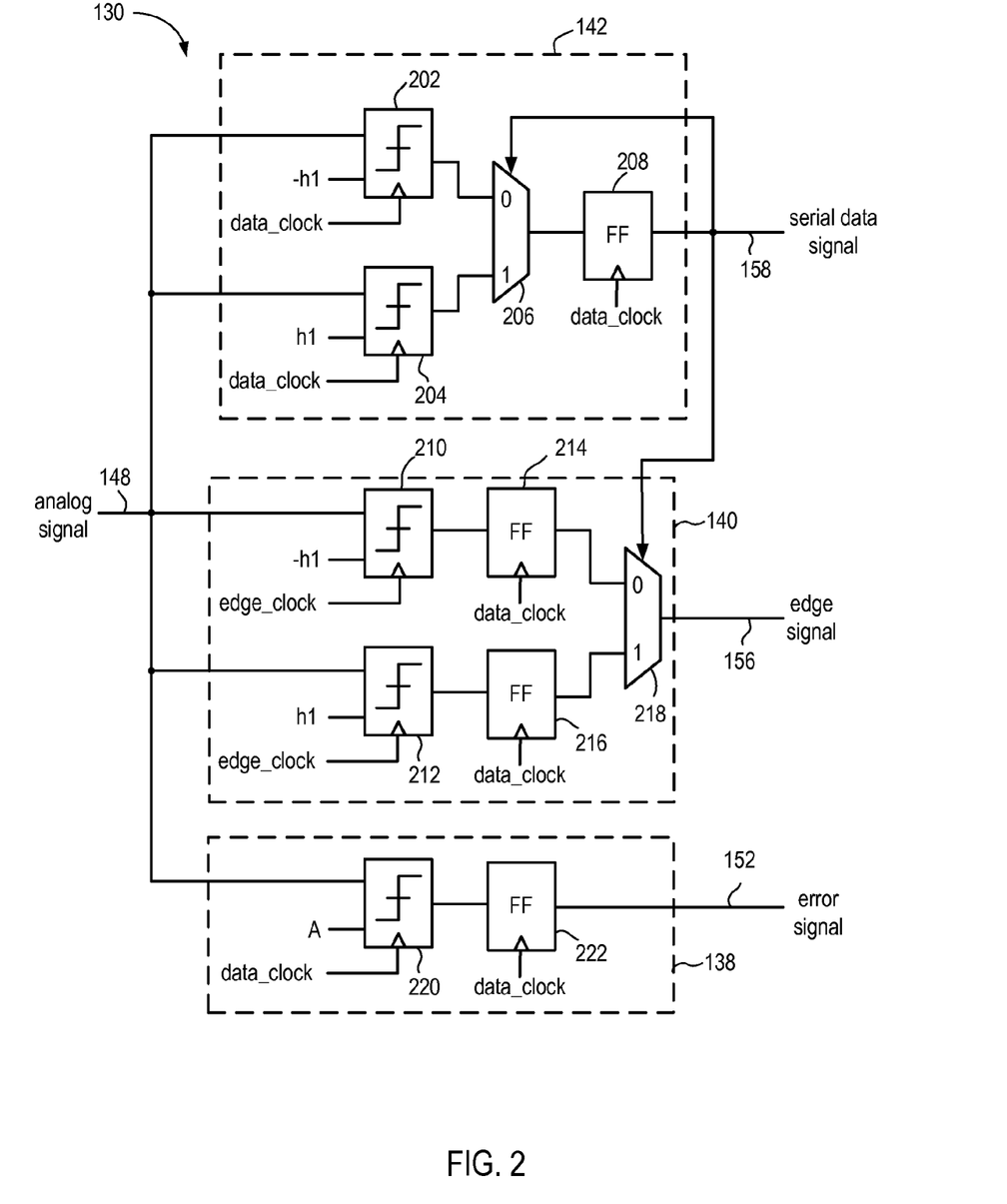
FIG. 2 is a block diagram depicting an example of the decision feedback equalizer (DFE).

FIG. 2 is a block diagram depicting an example of the DFE 130. The example DFE 130 comprises a speculative DFE having a single unrolled tap (h1). The analog signal 148 can be expressed in discrete time, at a time n, as:

$$y[n]=h(0)x[n]+h(1)x[n-1]+ \ldots +h(m)x[n-m],$$

where y is the analog signal 148 and x is the transmitted serial data signal. A current symbol, y[n] equals a transmitted symbol x[n] multiplied by some factor h(0) (also referred to as h0) and summed with some components of previous symbols (post-cursors) h(k)x[n−k] for k=1 . . . m (post-cursor ISI). The tap controller 132 executes an algorithm to minimize post-cursor ISI, and hence operates to minimize h(k) for k=1 . . . m (the taps of the DFE 130). In the present example, the DFE 130 includes a single tap h(1) (i.e., k=1), which is also referred to as h1.

The data sampler 142 includes a decision circuit 202, a decision circuit 204, a multiplexer 206, and a flip-flop 208. First inputs of the decision circuits 202 and 204 are configured to receive the analog signal 148. Second inputs of the decision circuits 202 and 204 are configured to receive reference voltages −h1 and h1, respectively, where h1 is the first tap of the DFE 130 and −h1 is of opposite polarity from h1. Clock inputs of the decision circuits 202 and 204 are configured to receive a sampling clock centered in the data eye (data_clock). The reference voltages −h1 and h1 are generated by the tap controller 132 shown in FIG. 1. Connections between the DFE 130 and the tap controller 132 are omitted from FIG. 2 for clarity.

Each of the decision circuits 202 and 204 latches the analog signal 148, compares the latched value to a decision threshold, and outputs a decision of a logic "1" or a logic "0" depending on the comparison. The decision circuit 204 outputs a logic "1" if the amplitude of the analog signal 148 is greater than h1 at the sampling point of data_clock, and outputs a logic "0" if the amplitude of the analog signal 148 is less than h1 at the sampling point of data_clock. The decision circuit 202 outputs a logic "1" if the amplitude of the analog signal 148 is greater than −h1 at the sampling point of data_clock, and outputs a logic "0" if the amplitude of the analog signal 148 is less than −h1 at the sampling point of data_clock.

Inputs of the multiplexer 206 are coupled to outputs of the decision circuits 202 and 204, respectively. An output of the multiplexer 206 is coupled an input of the flip-flop 208. A control input of the multiplexer 206 is coupled to an output of the flip-flop 208. A clock input of the flip-flop 208 is configured to receive data_clock. The multiplexer 206 selects the output of the decision circuit 202 when the flip-flop 208 outputs a logic "0". The multiplexer 206 selects the output of the decision circuit 204 when the flip-flop 208 outputs a logic "1". The output of the flip-flop 208 provides the serial data signal 158.

Figure 3:
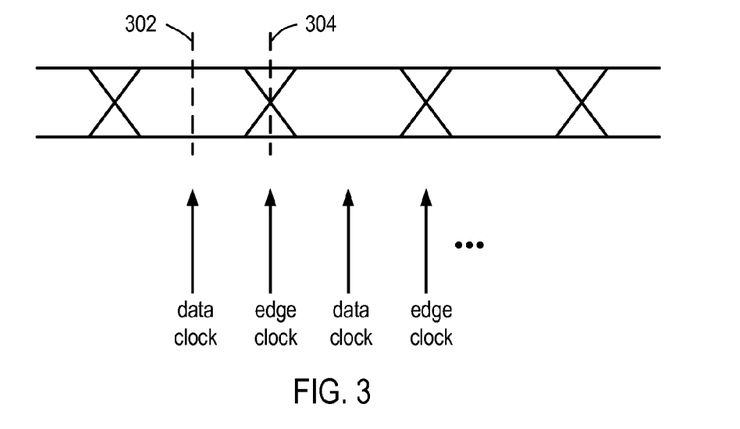
FIG. 3 depicts the relationship between the data sampling clock (data_clock) and the edge sampling clock (edge_clock) with respect to the serial data signal for the DFE of FIG. 2.

The edge sampler 140 includes a decision circuit 210, a decision circuit 212, flip-flop 214, a flip-flop 216, and a multiplexer 218. First inputs of the decision circuits 210 and 212 are configured to receive the analog signal 148. Second inputs of the decision circuits 210 and 212 are configured to receive reference voltages −h1 and h1, respectively. Clock inputs of the decision circuits 210 and 212 are configured to receive a sampling clock centered at the edges of the expected serial data signal (edge_clock). FIG. 3 depicts the relationship between the data sampling clock (data_clock) and the edge sampling clock (edge_clock) with respect to the serial data signal. The data sampling clock (data_clock) is aligned with a center 302 of the data eye. The edge sampling clock (edge_clock) is aligned with an edge 304 of the data eye.

Returning to FIG. 2, each of the decision circuits 210 and 212 latches the analog signal 148, compares the latched value to a decision threshold, and outputs a decision of a logic "1" or a logic "0" depending on the comparison. The decision circuit 212 outputs a logic "1" if the amplitude of the analog signal 148 is greater than h1 at the sampling point of edge_clock, and outputs a logic "0" if the amplitude of the analog signal 148 is less than h1 at the sampling point of edge_clock. The decision circuit 210 outputs a logic "1" if the amplitude of the analog signal 148 is greater than −h1 at the sampling point of edge_clock, and outputs a logic "0" if the amplitude of the analog signal 148 is less than −h1 at the sampling point of edge_clock.

An output of the decision circuit 210 is coupled to an input of the flip-flop 214. An output of the decision circuit 212 is coupled to an input of the flip-flop 216. Clock inputs of the flip-flops 214 and 216 are configured to receive the data sampling clock (data_clock). Outputs of the flip-flops 214 and 216 are coupled to respective inputs of the multiplexer 218. A control input of the multiplexer 218 is coupled to the output of the flip-flop 208. The multiplexer 218 selects the output of the flip-flop 214 when the flip-flop 208 outputs a logic "0". The multiplexer 206 selects the output of the flip-flop 216 when the flip-flop 208 outputs a logic "1". The output of the multiplexer 206 provides the edge signal 156.

The error sampler 138 comprises a decision circuit 220 and a flip-flop 222. A first input of the decision circuit 220 is configured to receive the analog signal 148. A second input of the decision circuit 220 is configured to receive a voltage reference signal (A). An output of the decision circuit 220 is coupled to an input of the flip-flop 222. Clock inputs of the decision circuit 220 and the flip-flop 222 receive the data_clock. An output of the flip-flop 222 provides the error signal 152. The voltage reference (A) can be a combination of the reference voltages h0 and h1 (e.g., one of h0+h1, h0−h1, −(h0+h1), and −(h0−h1)) selected based on the current symbol decision and the most previous symbol decision. The decision circuit 220 latches the analog signal 148, compares the latched value to the decision threshold, and outputs a decision of logic "1" or logic "0". The flip-flop 222 stores the decision output from the decision circuit 220.

In a first scenario, the first tap (h1) is positive and larger than the amplitude of the noise. In such scenario, when the serial data signal is lost (i.e., the analog signal 148 comprises noise and no signal), the speculative decision paths output decisions of opposite polarity. As such, both the data sampler 142 and the edge sampler 140 output a deterministic pattern comprising an alternating sequence of logic "1" and logic "0" (e.g., 101010 . . . or a "clock pattern"). At least for the edge signal 156, the clock pattern is unique and does not occur in normal operation of the DFE 130 when the serial data signal is present on the channel 160. Moreover, the adaptation algorithm performed by the tap controller 132 will cause h1 to increase over time. This results in a feedback loop that guarantees that the samplers output the clock pattern. In some cases, the serial data signal being transmitted may include a clock pattern as "data" being transmitted. However, in such case, the edge signal 156 would not have such a clock pattern. Thus, in some examples, the signal loss detector 136 monitors the edge signal 156 for the clock pattern to confirm signal loss. In some examples, the signal loss detector 136 can monitor both the serial data signal 158 and the edge signal 156 and assert loss of signal if the edge signal 156 has the clock pattern or if both the serial data signal 158 and the edge signal 156 have the clock pattern. Note that, for a given symbol, the magnitude of h1 may be smaller than the amplitude of the noise. However, as long as the mean amplitude of the noise is less than the magnitude of h1, h1 will continue to increase until the magnitude of h1 is much larger than the amplitude of the nose.

In a second scenario, h1 is negative. In such scenario, the speculative decision paths output decisions stuck at a particular polarity. As such, both the data sampler 142 and the edge sampler 140 output a deterministic pattern comprising a sequence of logic "1" or a sequence of logic "0" (e.g., 1111 . . . or 0000 . . . referred to as a "constant logic pattern"). Similar to the scenario discussed above, in some adaptation algorithms, the magnitude of h1 will increase (with opposite polarity), reinforcing the constant logic pattern as long as the serial data signal is absent on the channel 160. In other adaptation algorithms, h1 cannot adapt when the serial data signal 158 comprises the constant logic pattern. Even if h1 does not adapt, the edge signal 156 will have the constant logic pattern, which can be detected by the signal loss detector 136.

In a third scenario, the noise on the channel 160 includes a large DC component that is greater than the magnitude of h1 when the signal is lost. In such scenario, the serial data signal 158 and the edge signal 156 will both include the constant logic pattern, similar to the second scenario discussed above.

Figure 4:
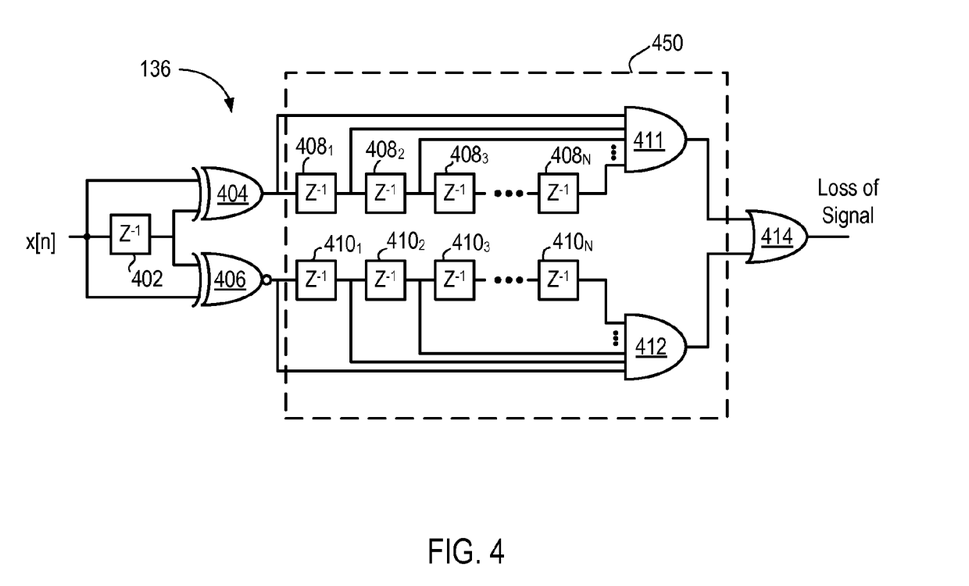
FIG. 4 is a schematic diagram illustrating an example of the signal loss detector.

FIG. 4 is a schematic diagram illustrating an example of the signal loss detector 136. The signal loss detector 136 includes a delay element 402, an exclusive OR (XOR) gate 404, an exclusive NOR (XNOR) gate 406, delay elements 408, delay elements 410, an AND gate 411, an AND gate 412, and an OR gate 414. An input of the first delay element 402 is configured to receive an input signal (x[n]). The input signal can be the edge signal 156 or the serial data signal 158.

The XOR gate 404 and the XNOR gate 406 comprise "input combinatorial logic" coupled to receive the input signal (x[n]) and an output of the first delay element 402. The delay elements 408 and 410 comprise "delay logic" coupled to an output of the input combinatorial logic. In particular, the delay elements 408 form a first chain of delay elements $408_1$ through $408_N$, and the delay elements 410 form a second chain of delay elements $410_1$ through $410_N$, where N is an integer greater than one. An input of the first chain of delay elements $408_1$ through $408_N$ is coupled to an output of the XOR gate 404. An input of the second chain of delay elements $410_1$ through $410_N$ is coupled to an output of the XNOR gate 406. The delay elements 408, the delay elements 410, the AND gate 411, and the AND gate 412 comprises one example of a detector 450 for detecting patterns in the input.

The AND gate 411 and the AND gate 412 comprise "output combinatorial logic" coupled to outputs of the delay logic. In particular, inputs of the AND gate 411 are coupled to outputs of the delay elements $408_1$ through $408_N$, respectively. Inputs of the AND gate 412 are coupled to outputs of the delay elements $410_1$ through $410_N$, respectively. The OR gate 414 comprises an "output circuit" configured to output a "loss-of-signal" signal. Inputs of the OR gate 414 are coupled to outputs of the AND gates 411 and 412, respectively.

The delay element 402, the delay elements 408, and the delay elements 410 can include any type of circuit for delaying a signal, such as flip-flops, programmable shift registers, and the like. The delay elements 402 receive a sampling clock, which is omitted from FIG. 4 for clarity. The signal loss detector 136 can receive a sampling clock from the CDR 134, which can be the "data_clock" used by the DFE 130.

In operation, if the input signal (x[n]) has the clock pattern, the XOR gate 404 outputs logic "1" for each clock cycle. In such case, a logic "1" propagates down the chain of delay elements $408_1$ through $408_N$. When each of the delay elements 408 stores a logic "1", the output of the AND gate 411 is asserted, causing the OR gate 414 to assert loss of signal. Hence, the signal loss detector 136 detects N-bits of the clock pattern to assert loss of signal. If the input signal (x[n]) has the constant logic pattern, the XNOR gate 406 outputs logic "1" for each clock cycle. In such case, a logic "1" propagates down the chain of delay elements $410_1$ through $410_N$. When each of the delay elements 410 stores a logic "1", the output of the AND gate 412 is asserted, causing the OR gate 414 to assert loss of signal. Hence, the signal loss detector 136 detects N-bits of the constant logic pattern to assert loss of signal. Overall, the signal loss detector 136 detects N-bits of either the clock pattern or the constant logic pattern to assert loss of signal. Increasing N makes detection less sensitive to signal loss, but lower probability of false detection. Decreasing N makes detection more sensitive to signal loss, but increases probability of false detection. N can be programmed to meet various detection sensitivity requirements.

FIG. 4 shows one example logic structure for the signal loss detector 136. Other logic structures are possible that include input combinatorial logic, delay logic, output combinatorial logic, and an output circuit that are functionally equivalent to the logic shown in FIG. 4 and described above.

Figure 5:
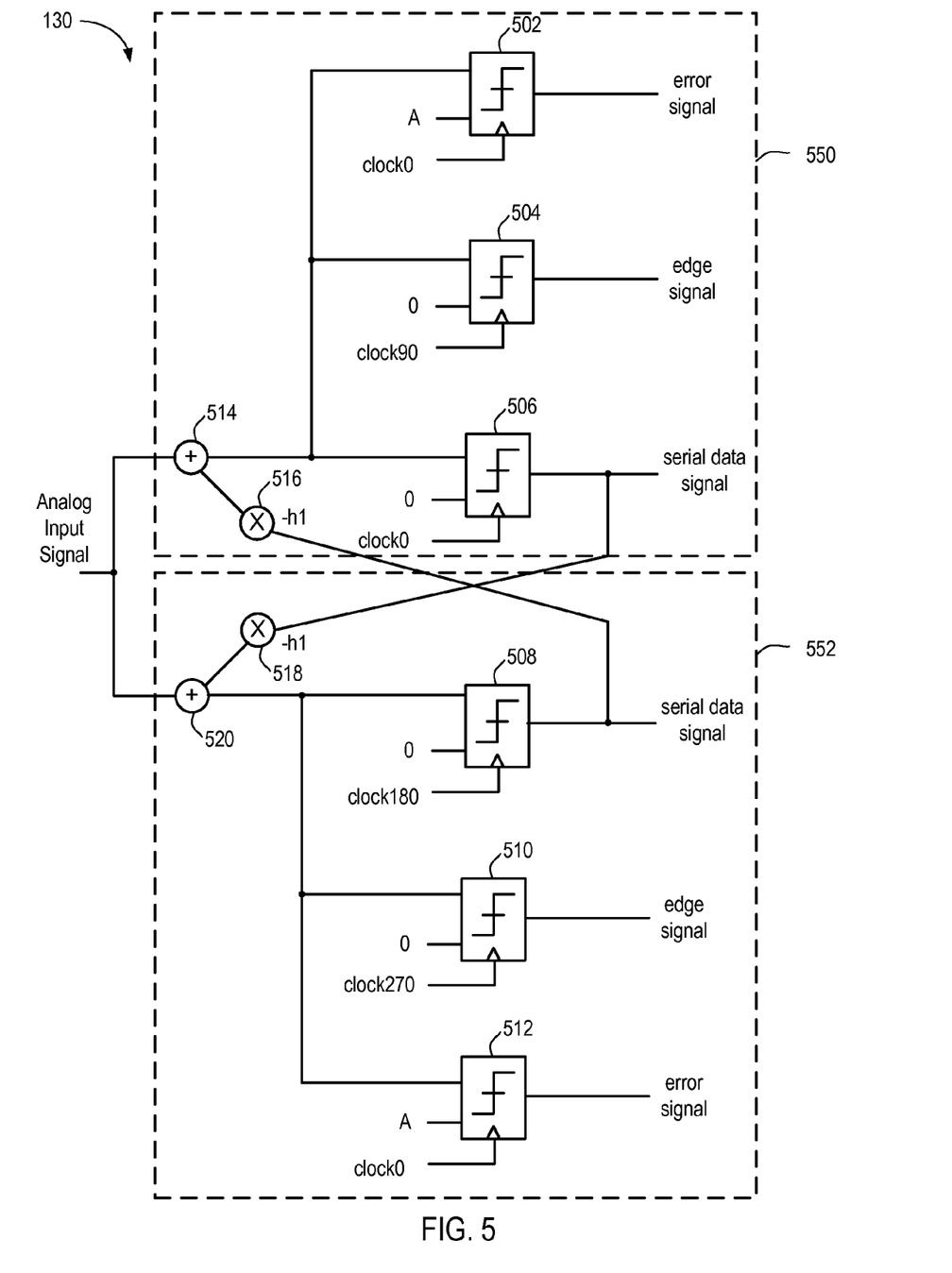
FIG. 5 is a block diagram depicting another example of the DFE.

FIG. 5 is a block diagram depicting another example of the DFE 130. The example DFE 130 comprises a half-rate DFE architecture with a signal tap and direct feedback. The DFE 130 includes an even path 550 and an odd path 552 each operating at half-rate that are multiplexed to provide data, edge, and error decisions at the full rate. The even path 550 includes decision circuits 502, 504, and 506, an adder 514, and a multiplier 516. The odd path 552 includes decision circuits 508, 510, and 512, an adder 520, and a multiplier 518.

On the even path 550, one input of the adder 514 is configured to receive the analog input signal, and another input of the adder 514 is coupled to an output of the multiplier 516. One input of the multiplier 516 is coupled to the output of the decision circuit 508, and another input of the multiplier 516 is coupled to receive a voltage reference −h1 from the tap controller 132. An output of the adder 514 is coupled to first inputs of the decision circuits 502, 504, and 506. A second input of the decision circuit 502 is coupled to receive a voltage reference (A), as second input of the decision circuit 504 is coupled to receive a voltage reference (0), and a second input of the decision circuit 506 is coupled to receive a voltage reference (0). A clock input of the decision circuit 502 is coupled to receive a sampling clock (clock0), a clock input of the decision circuit 504 is coupled to receive a sampling clock (clock90), and a clock input of the decision circuit 506 is coupled to receive the sampling clock (clock0). The sampling clock (clock90) is shifted ninety degrees with respect to the sampling clock (clock0). An output of the decision circuit 502 provides an error signal, an output of the decision circuit 504 provides an edge signal, and an output of the decision circuit 506 provides a serial data signal.

On the odd path 552, one input of the adder 520 is configured to receive the analog input signal, and another input of the adder 520 is coupled to an output of the multiplier 518. One input of the multiplier 518 is coupled to the output of the decision circuit 506, and another input of the multiplier 518 is coupled to receive a voltage reference −h1 from the tap controller 132. An output of the adder 520 is coupled to first inputs of the decision circuits 508, 510, and 512. A second input of the decision circuit 508 is coupled to receive a voltage reference (0), as second input of the decision circuit 510 is coupled to receive a voltage reference (0), and a second input of the decision circuit 512 is coupled to receive a voltage reference (A). A clock input of the decision circuit 508 is coupled to receive a sampling clock (clock180), a clock input of the decision circuit 510 is coupled to receive a sampling clock (clock270), and a clock input of the decision circuit 512 is coupled to receive the sampling clock (clock0). The sampling clock (clock180) is shifted 180 degrees with respect to the sampling clock (clock0). The sampling clock (clock270) is shifted 270 degrees with respect to the sampling clock (clock0). An output of the decision circuit 508 provides serial data signal, an output of the decision circuit 510 provides an edge signal, and an output of the decision circuit 512 provides an error signal.

Figure 6:
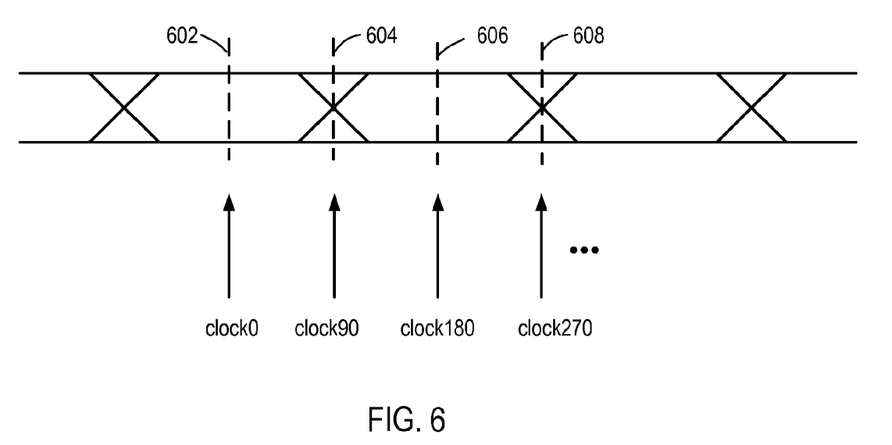
FIG. 6 depicts the relationship between the sampling clocks of the DFE shown in FIG. 5 with respect to the serial data signal.

FIG. 6 depicts the relationship between the sampling clocks of the DFE 130 shown in FIG. 5 with respect to the serial data signal. The sampling clock (clock0) is aligned with a center 602 of the data eye. The sampling clock (clock90) is aligned with an edge 604 of the data eye and shifted 90 degrees with respect to clock0. The sampling clock (clock180) is aligned with a center 606 of the data eye and shifted 180 degrees with respect to the clock0. The sampling clock (clock270) is aligned with an edge 608 of the data eye and shifted 270 degrees with respect to the clock0.

In the architecture of FIG. 5, when the serial data signal is lost, the serial data signal and the edge signal in the even path 550 will be stuck at logic "1" or logic "0". Likewise, the serial data signal and the edge signal in the odd path 552 will be stuck at logic "1" or logic "0". When the even and odd paths are multiplexed, the serial data signal 158 will comprise either the clock pattern or the constant logic pattern. Likewise, the edge signal 156 will comprise either the clock pattern or the constant logic pattern.

Figure 7:
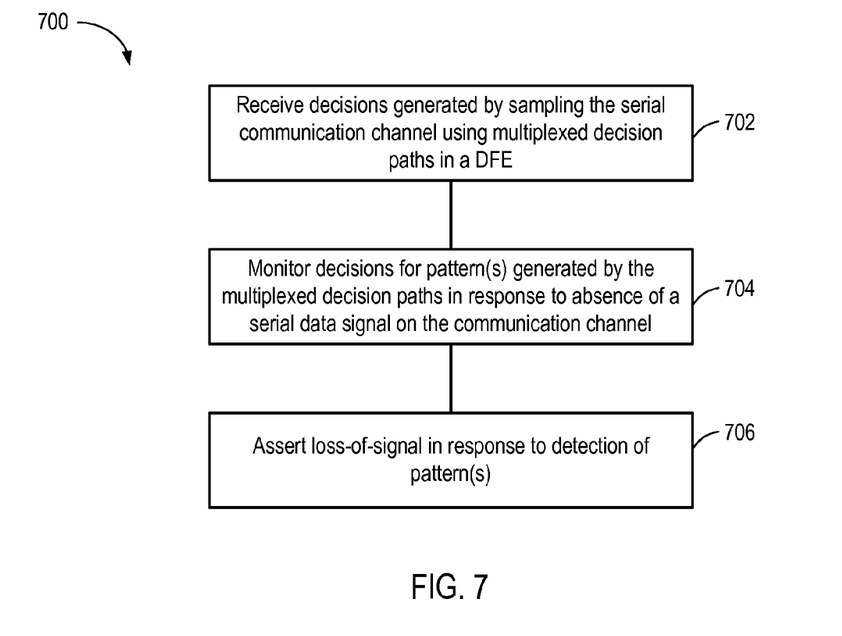
FIG. 7 is a flow diagram depicting an example method of detecting loss of signal on a serial communication channel coupled to a receiver.

FIG. 7 is a flow diagram depicting an example method 700 of detecting loss of signal on a serial communication channel coupled to a receiver. The method 700 can be performed in the receiver 126. The method 700 begins at block 702, where the signal loss detector 136 receives decisions generated by sampling the serial communication channel 160 using multiplexed decision paths in the DFE 130. At block 704, the signal loss detector 136 monitors the decisions for pattern(s) generated by the multiplexed decision paths in response to absence of a serial data signal on the communication channel 160. At block 706, the signal loss detector 136 asserts loss-of-signal in response to detection of at least one pattern indicative of signal loss.

While the foregoing is directed to specific examples, other and further examples may be devised without departing from the basic scope thereof, and the scope thereof is determined by the claims that follow.

What is claimed is:

1. An apparatus for detecting signal loss on a serial communication channel coupled to a receiver, comprising:
an input configured to receive decisions generated by sampling the serial communication channel using multiplexed decision paths in a decision feedback equalizer (DFE), the decisions including edge decisions generated by an edge sampler in the DFE and data decisions generated by a data sampling in the DFE;
a detector coupled to the input and including circuitry configured to monitor the edge decisions for at least one pattern in the edge decisions generated by the multiplexed decision paths in response to sampling noise in absence of a serial data signal on the serial communication channel, the at least one pattern consisting of a plurality of the edge decisions; and
an output circuit coupled to the detector and configured to assert loss-of-signal in response detection of the at least one pattern by the detector.

2. The apparatus of claim 1, wherein the circuitry in the detector is configured to monitor both the edge decisions and the data decisions for the at least one pattern.

3. The apparatus of claim 1, wherein the multiplexed decision paths comprise even and odd paths of a half-rate sampler in the DFE.

4. The apparatus of claim 1, wherein the multiplexed decision paths comprise parallel decision paths of a speculative sampler in the DFE.

5. The apparatus of claim 1, wherein the circuitry in the detector comprises:
a first delay element coupled to receive the decisions;
input combinatorial logic coupled to receive the decisions and an output of the first delay element;

delay logic coupled to an output of the input combinatorial logic; and output combinatorial logic coupled to outputs of the delay logic.

6. The apparatus of claim 5, wherein the input combinatorial logic comprises an exclusive OR gate and an exclusive NOR gate, wherein the delay logic comprises a first chain of delay elements coupled to an output of the exclusive OR gate and a second chain of delay elements coupled to an output of the exclusive NOR gate, and wherein the output combinatorial logic comprises a first AND gate coupled to an output of each delay element in the first chain and a second AND gate coupled to an output of each delay element in the second chain.

7. The apparatus of claim 6, wherein the output circuit comprises an OR gate coupled to respective outputs of the first AND gate and the second AND gate.

8. A method of detecting loss of signal on a serial communication channel coupled to a receiver, comprising:
receiving decisions generated by sampling the serial communication channel using multiplexed decision paths in a decision feedback equalizer (DFE), the decisions including edge decisions generated by an edge sampler in the DFE and data decisions generated by a data sampling in the DFE;

monitoring the edge decisions for at least one pattern in the edge decisions generated by the multiplexed decision paths in response to sampling noise in absence of a serial data signal on the serial communication channel, the at least one pattern consisting of a plurality of the edge decisions; and asserting loss-of-signal in response to detection of the at least one pattern.

9. The method of claim 8, wherein the method further includes monitoring the data decisions for the at least one pattern.

10. The method of claim 8, wherein the multiplexed decision paths comprise even and odd paths of a half-rate sampler in the DFE.

11. The method of claim 8, wherein the multiplexed decision paths comprise parallel decision paths of a speculative sampler in the DFE.

12. The method of claim 8, wherein the loss-of-signal is asserted in response to detection of a pattern comprising an alternating sequence of logic "1" and logic "0" values.

13. The method of claim 8, wherein the loss-of-signal is asserted in response to detection of a pattern comprising either a sequence of logic "0" values or a sequence of logic "1" values.

14. The method of claim 8, wherein the at least one pattern is detected in response to each decision path of the multiplexed decision paths being locked to output a logic "1" decision or a logic "0" decision.

15. A receiver, comprising: a decision feedback equalizer (DFE) configured to generate decisions by sampling a serial communication channel using multiplexed decision paths, the decisions including edge decisions generated by an edge sampler in the DFE and data decisions generated by a data sampling in the DFE; and a signal loss detector, coupled to the DFE, including circuitry configured to monitor the edge decisions for at least one pattern in the edge decisions generated by the multiplexed decision paths in response to sampling noise in absence of a serial data signal on the serial communication channel and assert loss-of-signal in response to detection of the at least one pattern, the at least one pattern consisting of a plurality of the edge decisions.

16. The receiver of claim 15, further comprising:
a buffer coupled to the serial communication channel and configured to provide an analog signal for sampling by the DFE.

17. The receiver of claim 15, wherein the circuitry in the signal loss detector is configured to monitor the both the edge decisions and the data decisions for the at least one pattern.

18. The receiver of claim 15, wherein the multiplexed decision paths comprise even and odd paths of a half-rate sampler in the DFE.

19. The receiver of claim 15, wherein the multiplexed decision paths comprise parallel decision paths of a speculative sampler in the DFE.

20. The receiver of claim 15, wherein the circuitry in the signal loss detector comprises:
a first delay element coupled to receive the decisions;
input combinatorial logic coupled to receive the decisions and an output of the first delay element;
delay logic coupled to an output of the input combinatorial logic; and
output combinatorial logic coupled to outputs of the delay logic.

* * * * *